(12) United States Patent
Ivry et al.

(10) Patent No.: US 12,533,524 B2
(45) Date of Patent: Jan. 27, 2026

(54) KILOHERTZ TRANSCRANIAL MAGNETIC PERTURBATION (KTMP) SYSTEM

(71) Applicant: THE REGENTS OF THE UNIVERSITY OF CALIFORNIA, Oakland, CA (US)

(72) Inventors: Richard Irwin Ivry, El Cerrito, CA (US); Daniel J. Sheltraw, Albany, CA (US); Ludovica Labruna, Kensington, CA (US); Benjamin A. Inglis, Lafayette, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1059 days.

(21) Appl. No.: 17/311,596

(22) PCT Filed: Nov. 27, 2019

(86) PCT No.: PCT/US2019/063514
§ 371 (c)(1),
(2) Date: Jun. 7, 2021

(87) PCT Pub. No.: WO2020/123154
PCT Pub. Date: Jun. 18, 2020

(65) Prior Publication Data
US 2022/0016434 A1 Jan. 20, 2022

Related U.S. Application Data

(60) Provisional application No. 62/777,809, filed on Dec. 11, 2018.

(51) Int. Cl.
*A61N 2/00* (2006.01)
*A61N 2/02* (2006.01)

(52) U.S. Cl.
CPC ............... *A61N 2/006* (2013.01); *A61N 2/02* (2013.01)

(58) Field of Classification Search
CPC .................. A61N 2/006; A61N 2/02
(Continued)

(56) References Cited

U.S. PATENT DOCUMENTS

| 5,738,625 A | 4/1998 | Gluck |
| 2006/0004244 A1 | 1/2006 | Phillips et al. |

(Continued)

FOREIGN PATENT DOCUMENTS

| WO | 2006134598 A2 | 12/2006 |
| WO | 2018185369 A1 | 11/2018 |

OTHER PUBLICATIONS

Labruna L, Jamil A, Fresnoza S, Batsikadze G, Kuo MF, Vanderschelden B, Ivry RB, Nitsche MA. Efficacy of Anodal Transcranial Direct Current Stimulation is Related to Sensitivity to Transcranial Magnetic Stimulation. Brain Stimul. Jan.-Feb. 2016;9(1):8-15. doi: 10.1016/j.brs.2015.08.014. (Year: 2015).*

(Continued)

*Primary Examiner* — Sunita Reddy
(74) *Attorney, Agent, or Firm* — Miller Nash LLP

(57) ABSTRACT

A magnetic stimulation system includes a magnetic coil to generate an electric field of a magnitude having a desired effect on a brain, a voltage to current source to generate a current waveform having an amplitude and frequency to produce the electric field, and a controller to control the voltage to current source and to apply the current to the magnetic coil to provide perturbation of brain tissue using one or more periods of either continuously induced electric field with constant amplitude and frequency, or periods of electric field with at least one of amplitude and frequency modulation. A method of magnetically stimulating a brain (Continued)

includes placing a coil near a brain, and applying a current having an amplitude and frequency to the coil to produce an electric field having a desired effect on the brain, wherein the amplitude and frequency are applied using one of either one or more periods of continuously induced electric fields with constant amplitude and frequency, or periods of an electric field with at least one of either amplitude and frequency modulation.

12 Claims, 2 Drawing Sheets

(58) Field of Classification Search
USPC ....................................................... 600/9–15
See application file for complete search history.

(56) References Cited

U.S. PATENT DOCUMENTS

| | | |
|---|---|---|
| 2006/0199992 A1 | 9/2006 | Eisenberg et al. |
| 2006/0287566 A1 | 12/2006 | Zangen et al. |
| 2007/0293916 A1 | 12/2007 | Peterchev |
| 2010/0113959 A1 | 5/2010 | Pascual-Leone et al. |
| 2010/0152522 A1 | 6/2010 | Roth et al. |
| 2012/0157752 A1* | 6/2012 | Nishikawa ............. A61N 2/008 600/15 |
| 2013/0096363 A1* | 4/2013 | Schneider ................ A61N 1/20 600/13 |
| 2013/0150653 A1 | 6/2013 | Borsody |
| 2014/0235927 A1 | 8/2014 | Zangen et al. |
| 2014/0276182 A1* | 9/2014 | Helekar ............... A61B 5/4064 600/15 |
| 2015/0174423 A1 | 6/2015 | Fitzgerald et al. |
| 2015/0246238 A1 | 9/2015 | Moses et al. |
| 2015/0367141 A1 | 12/2015 | Goetz et al. |
| 2016/0346562 A1* | 12/2016 | Saitoh ...................... A61N 2/02 |
| 2018/0071545 A1 | 3/2018 | Saitoh et al. |
| 2021/0393955 A1* | 12/2021 | Hagedorn ............. A61B 5/291 |

OTHER PUBLICATIONS

7700 Series Power Amplifiers Datasheet, by Aetechron, Jul. 31, 2018, pp. 1-3. Accesses on the internet on Apr. 16, 2025 at URL: https://www.scientific-devices.com.au/wp-content/uploads/2019/02/7700seriesEMCdatasheet.pdf (Year: 2018).*
International Search Report and Written Opinion, PCT/US2019/063514, Jan. 8, 2020, 11 pages.
Cantarero et al., Celebellar Direct Current Stimulation Enhances On-Line Motor Skill Acquisition through an Effect on Accuracy, J. Neuroscience, 35(7):3285-3290, Feb. 18, 2015.
Chaieb et al., "Transcranial alternating current stimultion in the low kHz range increases motor cortex excitability," Restorative Neurology and Neuroscience, 29, pp. 167-175 (2011).
Chaieb et al., "Safety of 5 kHz tACS," Brain Stimulation, 7, pp. 92-96 (2014).
Chhatbar et al., "Safety and tolerability of transcranial direct current stimulation to stroke patients—A phase I current escalation study," Brain Stimulation, 10, pp. 553-559 (2017).
Conson et al., "Transcranial Electrical Stimulation over Dorsolateral Prefrontal Cortex Modulates Processing of Social Cognitive and Affective Information," PLOS One, May 7, 2015, 14 pages.
Deng et al., "Electric field depth-focality tradeoff in transcranial magnetic stimulatoin: simulation comparison of 50 coil designs," Brain Stimulation, 6(1), Jan. 2013, 13 pages.
Fava et al., Double-bind, proof-of-concept (POC) trial of Low-Field Magnetic Stimulation (LFMS) augmentation of antidepressant therapy in treatment-resistant depression (TRD), Brain Stimulation 11, (2018) 75-84.
Floel et al. "Noninvasive Brain Stimulation Improves Language Learning," J. Cognitive Neuroscience, 20:8, pp. 1415-1422 (2008).

Galea et al., "Dissociating the Roles of the Cerebellum and Motor Cortex during Adaptive Learning: The Motor Cortex Retains What the Cerebellum Learns," Cerebral Cortex, 21, pp. 1761-1770, Aug. 2011.
Giglia et al., "Anodal transcranial direct current stimulation of the right dorsolateral prefrontal cortex enhances memory-guided responses in a visuospatial working memory task," Functional Neurology, 29(3), pp. 189-193 (2014).
Heimrath et al., "Modulation of pre-attentive spectro-temporal feature processing in the human auditory systems by HD-tDCS," European J. Neuroscience, 41, pp. 1580-1586 (2015).
Hordacre et al., "Variability in neural excitability and plasticity induction in the human cortex: A brain stimulation study," Brain Stimulation 10, pp. 588-595 (2017).
Horvath et al., "No significant effect of transcranial direct current stimulation (tDCS) found on simple motor reaction time comparing 15 different simulation protocols," Neuropsychologia, 91, pp. 544-552 (2016).
Hsu et al., "Effects of noninvasive brain stimulation on cognitive function in healthy aging and Alzheimer's disease: a systematic review and meta-analysis," Neurobiology of Aging 36, pp. 2348-2359 (2015).
Huang et al., "Measurements and models of electric fields in the in vivo human brain during transcranial electric stimulation," eLife Sciences, 6:e18834, pp. 1-26, Feb. 7, 2017.
Wostmann et al., "Opposite effects of lateralised transcranial alpha versus gamma stimulation on auditory spatial attention," Brain Stimulation, 11, pp. 752-758 (2018).
Javadi et al., "Oscillatory Reinstatement Enhances Declarative Memory," J. Neuroscience, 37:41, pp. 9939-9944, Oct. 11, 2017.
Koops et al., "Transcranial direct current stimulation as a treatment for auditory hallucinations," Frontiers in Psychology, 6:244, Mar. 6, 2015, 6 pages.
Kunz et al., "5kHz Transcranial Alternating Current Stimulations: Lack of Cortical Excitability Changes when Grouped in a Theta Burst Pattern," Frontiers in Human Neuroscience, 10:683, Jan. 10, 2017, 8 pages.
Li et al., "Clinical utility of brain stimulation modalities following traumatic brain injury: current evidence, Neuropsychiatric Disease and Treatment," J. Neuropsychiatric Disease and Treatment, 5:11, pp. 1573-1586, Jun. 30, 2015.
Meinzer, "Transcranial direct current stimulation of the primary motor cortex improves word-retrieval in older adults," Frontiers in Aging Neuroscience, 6:253, Sep. 23, 2014, 9 pp.
Mondino et al., "Can transcranial direct current stimulation (tDCS) alleviate symptoms and improve cognition in psychiatric disorders? ", J. Biological Psychiatry, 15, pp. 261-275, 2014.
Huang et al., "Plascity induced by non-invasive transcranial brain stimulation: a position paper," Clinical Neurophysiology, 128, pp. 2318-2329 (2017).
Nevler and Ash, "TMS as a Tool for Examining Cognitive Processing," Current Neurology Rep, 15:52, (2015), 11 pages.
Nitsche and Paulus, "Excitablity changes induced in the human motor cortex by weak transcranial direct current stimulation," J. Physiology, 527:3, pp. I 633-I 639 (2000).
Peterchev et al., "Fundamentals of transcranial electric and magnetic stimulation dose: definition, selection, and reporting practices," Brain Stimulation, 5, pp. 435-453 (2012).
Richmond et al., "Transcranial Direct Current Stimulation Ehances Verbal Working Memory Training Performance over Time and Near Transfer Outcomes," J. Cognitive Neuroscience, 26:11, pp. 2443-2454 (2014).
Rohan et al., "Rapid Mood-Elevating Effects of Low Field Magnetic Stimulation in Depression," Biol. Psychiatry, 76:3, pp. 186-193, 2013.
Roy et al., "Modulation of attention functions by anodal (DCS on right PPC," Neuropsychologia, 74, pp. 96-107 (2015).
Rufener et al., "Transcranial Alternating Current Stimulation (tACS) differentially modulates speech perception in young and older adults," Brain Stimulation, 9, pp. 560-565 (2016).
Schilberg et al., "Interindividual Variability and Intraindividual Reliability of Intermittent Theta Burst Stimulation-induced Neuro-

(56) References Cited

OTHER PUBLICATIONS plasticity Mechanisms in the Healthy Brain," J. Cognitive Neuroscience, 26:6, pp. 1022-1032 (2017).
Volkow et al., "Effects of low-field magnetic stimulation on brain glucose metabolism," NeuroImage, 51, pp. 623-628 (2010).
Voroslakos et al., "Direct effects of transcranial electric stimulation on brain circuits in rats and humans," Nature Communications, DOI: 10.1038/s41467-018-02928-3 (2018).
Wang et al., "Redesigning existing transcranial magnetic stimulation coils to reduce energy: application to low field magnetic stimulation," J. Neural Eng., 15:3, Jun. 1, 2018, 28 pp.

\* cited by examiner

KILOHERTZ TRANSCRANIAL MAGNETIC PERTURBATION (KTMP) SYSTEM

CROSS-REFERENCE TO RELATED APPLICATION

This application is a 371 of International Application No. PCT/US2019/063514, filed Nov. 27, 2019, which claims priority to U.S. Provisional Patent Application No. 62/777,809, filed Dec. 11, 2018, the contents of which are incorporated by reference herein in their entirety.

STATEMENT REGARDING FEDERALLY SPONSORED RESEARCH AND DEVELOPMENT

This invention was made with government support under Grant No. NS092079 awarded by the National Institutes of Health. The government has certain rights in the invention.

TECHNICAL FIELD

This disclosure relates to non-invasive brain stimulation (NBIS), and more particularly to transcranial brain perturbation using a magnetic field.

BACKGROUND

The past 20 years have witnessed an exponential increase in the use of non-invasive brain stimulation (NIBS) as shown in FIG. 1. For basic research, NIBS provides a method to test functional hypotheses by inducing changes in targeted brain states. For translational work, NIBS methods have been shown to enhance performance in healthy individuals across a range of cognitive domains (Flöel et al., 2008; Reis et al., 2009; Galea et al., 2011; Giglia et al., 2014; Meinzer et al., 2014; Richmond et al., 2014; Cantarero et al., 2015; Conson et al., 2015; Heimrath et al., 2015; Nevler and Ash, 2015; Roy et al., 2015; Rufener et al., 2016; Javadi et al., 2017; Wöstmann et al., 2018) and are recognized as having tremendous potential as a treatment of neurological (Hsu et al., 2015; Li et al., 2015) and psychiatric (Mondino et al., 2014; Koops et al., 2015) disorders.

However, an important impediment to progress in NIBS research and clinical applications concerns the reliability and robustness of NIBS effects, an issue that has engendered considerable discussion in the literature (Horvath et al., 2016a; Hordacre et al., 2017; Kunz et al., 2017; Schilberg et al., 2017; Fava et al., 2018). These concerns reflect, in large part, limitations with current techniques and technologies.

DETAILED DESCRIPTION OF THE EMBODIMENTS

Figure 1:
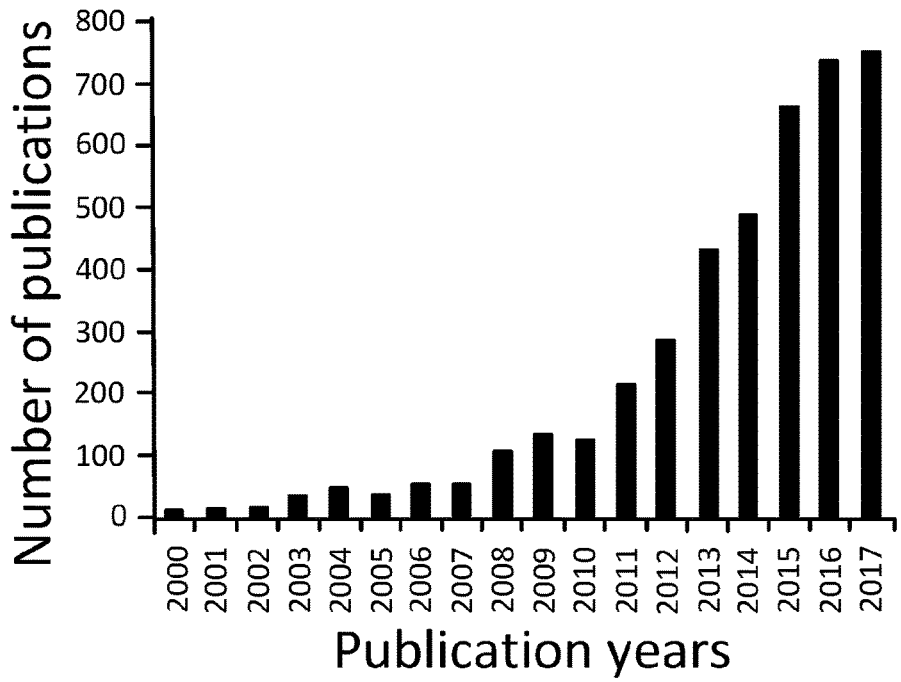
FIG. 1 shows a number of publications each year that reference non-invasive brain stimulation over 20 years.

Researchers use a range of methods to understand and manipulate brain function. On the observational end, sophisticated methods have been developed to measure neural activity at a broad range of scales. In research with human participants, non-invasive techniques such as electroencephalography (EEG) and functional magnetic resonance imaging (fMRI) can measure neural activity as the participants perceive stimuli, make decisions, or interact with the environment. These observational techniques are important tools for developing theories describing the functional organization of the many components of the human brain.

One important way to test these theories entails the use of experimental methods in which the functionality of a targeted region is altered. In research with human participants, the classic approach has been to study patients who have suffered naturally occurring neurological events, such as stroke, or disease, such as, Parkinson's disease, asking how damage to a particular region of the brain affects behavior. Although this approach has provided many important insights into brain function and organization, it is limited. First, there is considerable heterogeneity in the pathology and manifestation of brain injury and disease. Second, the brain is a highly plastic device, capable of extensive reorganization. This leads to limitations in the kinds of inferences that can be made from the study of brain-injured patients.

Since their emergence in the 1980's, NIBS methods have provided an alternative approach to modulate activity in targeted brain regions. Broadly speaking there are two types of NIBS systems presently: transcranial magnetic stimulation (TMS) and transcranial electrical stimulation (tES). Both methods couple to the targeted brain region through the electric fields (E-fields) they produce. TES produces its electric field by injecting a current through the skull by means of electrodes placed on the scalp. TMS, on the other hand, produces its electric field by means of magnetic induction due to a current-carrying coil placed near the scalp. The spatial extent of the neural perturbation depends on the configuration of the stimulating device. With TMS the perturbation impacts a brain volume of under 1 $cm^3$; the resolution is generally poorer with tES methods, although new high density systems have the potential to approach the resolution of TMS.

The electric fields induced by NIBS may be categorized as subthreshold or suprathreshold. Suprathreshold fields are strong enough to cause immediate action potentials in targeted neurons whereas subthreshold fields are not. In terms of cortical impact, suprathreshold E-fields directly elicit action potentials and are safely possible only with perturbation via magnetic fields. Subthreshold E-fields do not produce action potentials but can instead alter the excitability state of the targeted neurons. That is, the externally applied E-field affects the polarization of cellular membranes, thereby altering the likelihood that these neurons will fire in response to inputs arising from changes in the environment or the organism's endogenous state (Huang et al., 2017b). The electric fields of TMS and tES, whether suprathreshold or subthreshold, are used to produce transient changes in neural activity that allow researchers to ask how the behavior of neurologically healthy individuals is affected by the targeted perturbation.

For example, a short train of subthreshold TMS over inferior frontal cortex, in other words Broca's area, will disrupt the ability of a person to speak and allows researchers to test the importance of speech production in language comprehension. The effects of tES electric fields, which in humans are always subthreshold for reasons of safety, are more nuanced, since this form of stimulation does not directly activate neurons. Rather, it produces a change in the state of excitability of the targeted brain region, with the change being an increase or decrease in excitability depending upon the amplitude, direction and frequency of the electric field in the targeted region. By applying the current for an extended period, the change in the state of excitability can alter brain function, and thus either interfere with or enhance behavior. These changes, albeit transient, can persist beyond the duration of the applied electric field, indicating that the underlying mechanisms involve temporary structural changes to the brain tissue.

In addition to their widespread application in the study of brain function, NIBS methods have been recognized for their potential for neurorehabilitation, as well as in the treatment of psychiatric disorders. For example, in individuals with hemiparesis from stroke, TMS can be used to directly activate neurons in the motor cortex, helping the patient learn to produce movement from residual neural tissue. Alternatively, tES can be used to increase the state of excitability, facilitating the neural changes that occur during learning. For the past decade, the potential of TMS for treating patients with psychiatric disorders such as depression, mood disorders, especially patients who respond poorly to common drug therapies, has been investigated in clinical trials, with similar trials coming on line for tES.

Embodiments here involve a new device and method that opens a new experimental space for NIBS. The embodiments here comprise a kilohertz transcranial magnetic perturbation (kTMP). The kTMP system is designed to operate both in the subthreshold space of electric fields, as for tES systems, or in the suprathreshold regime, as for TMS. Initially embodiments only tested only subthreshold electric fields. Like tES, the kTMP system induces a continuous time varying electric field, in contrast to the pulsed electric fields that are produced from extant TMS systems. By using continuous high frequency magnetic fields, the kTMP system will substantially increase the dynamic range of the applied perturbation relative to tES methods. When delivered with a TMS coil, kTMP will maintain the spatial response of TMS. As such, kTMP has the potential to supplant tES methods for subthreshold perturbation, providing a much more robust tool for inducing transient changes in the state of excitability of targeted neural regions. It is anticipated that the effects on behavior will be similarly enhanced, providing an important new tool for basic research and translational applications.

The embodiments here substantially increase the dynamic range for inducing changes in the state of excitability of a targeted brain region. As such, the embodiments provide researchers and clinicians with a much more powerful NBIS system producing efficacious results in basic research and translation applications.

A standard TMS system consists of a coil placed near the scalp that is driven by a current source. Typically, the current source is a set of discharging capacitors that can deliver a peak current amplitude of approximately 5000-7000 A in the form of brief pulses of duration 250-280 microseconds. Each suprathreshold pulse induces an electric field (E-field) that can result in activation of neurons, in other words production of action potentials, along the cortical surface. Even when the current amplitude is reduced to levels that are assumed to be sub-threshold where no action potentials are produced, a TMS system's response is still pulsed, a restriction that has important implications for the spectrum of the resultant E-fields, as described below. In contrast, a typical tES system consists of two or more scalp electrodes driven by a continuous current source typically delivering 1 or 2 mA. The current can be constant, as in transcranial direct current stimulation (tDCS), or sinusoidal with variable frequency, as in transcranial alternating current stimulation (tACS). As noted above, tES is always sub-threshold, i.e. it alters neural excitability without directly inducing neural discharge as action potentials.

The neural consequence of NIBS is mediated by the E-field established by the current source. Whether cortical excitability is enhanced or diminished depends on the temporal characteristics of the induced E-field, the waveform, or equivalently the frequency spectrum, and duration, and it may depend upon spatial characteristics such as the local amplitude and direction (Peterchev et al., 2012). The amplitude of a tES E-field, which is applied through electrical contact with the scalp, is linearly dependent upon the amplitude of the applied current but independent of the E-field frequency. In contrast, the amplitude of an E-field produced via magnetic induction, as in TMS and kTMP, is linearly dependent upon both the frequency and amplitude of the applied current. However, repetitively pulsing extant TMS systems at low level and a prescribed rate is not equivalent to the continuous magnetic field of the kTMP system; the frequency responses are radically different.

The discussion now reviews the key differences between (1) tES applied at low frequencies—typically 0-100 Hz—(2) pulsed TMS applied subthreshold, and (3) the proposed kTMP system applied subthreshold. While extant TMS systems operate using capacitive circuits with a resonant frequency of around 4 or 5 kHz, that frequency is not considered to be important in the E-field interaction with the brain. Instead, it is believed to be the relatively low pulse repetition rate—typically 0.1-50 pulses per second—that is being exploited. The brain is believed to be translucent to the larger E-fields produced at the resonant circuit frequency of 4 or 5 kHz. One embodiment of the kTMP system operates at a frequency of 1-5 kHz, but with a critical difference compared to extant TMS systems. One should note that while the particular embodiments here employ specific operating frequency ranges, E-field strengths, and reference to subthresholds, no limitation to any particular range or value is intended, nor should any be implied.

The magnetic fields emitted from kTMP can be applied continuously, or pulsed, as desired. When applied continuously, there is reason to believe that these kHz E-fields will interact with the brain in analogous manner to the low frequency continuous E-fields applied with tES. Published evidence demonstrates that the brain is not translucent to kHz E-fields, as widely accepted in TMS applications, but that there can be distinct, strong, reproducible interactions. The discussion reviews these studies below.

There is a recent body of work exploring the efficacy of subthreshold E-fields at kHz frequencies to modulate brain activity. Most pertinent to kTMP, it was shown that stimulation with subthreshold 1-5 kHz tACS (Chaieb et al., 2011, 2014), a form of tES, induces changes in neural excitability approximately equal to those seen with conventional tES methods such as 1-2 mA tDCS (Nitsche and Paulus, 2000). Next, a low-field magnetic stimulation (LFMS) device was applied to a whole head with an MRI-like gradient coil, again using kHz frequencies (Rohan et al., 2014; Wang et al., 2018). The driving currents are very low, and the oscillating magnetic fields that are produced essentially mimic the magnetic field waveforms used in MRI.

To date, the study of the effects of LFMS on behavior are limited, based on reports of mood-altering effects. Moreover, LFMS can only produce modest E-fields, falling within the same range as tES systems. Nonetheless, taken together the kHz tACS and LFMS results highlight the potential of NIBS in the kHz range. Further evidence that subthreshold kHz perturbation can induce physiological changes comes from studies showing that the kHz E-fields induced by switched MRI gradients alter brain glucose metabolism in a manner that scales with the field amplitude (Volkow et al., 2010).

The amplitude of the E-field is independent of stimulation frequency for all forms of tES, including kHz tACS. With kTMP, one can produce subthreshold kHz E-fields with an order of magnitude greater amplitude than LFMS and any tES variant. The discussion now considers safety and efficacy of the E-fields produced by the kTMP system, relative to other NIBS approaches. For a given cortical E-field amplitude, tES is associated with a much larger scalp electric current density than TMS. As such, safety issues regarding scalp heating and comfort impose a critical limit on the maximum amplitude of tES-induced cortical E-fields. Recent estimates of the cortical E-field induced by 1.0 mA tES in humans range from 0.17 V/m (Vöröslakos et al., 2018) to 0.38 V/m (Huang et al., 2018). Given that almost all studies to date have been conducted at 1 or 2 mA, the maximum induced E-fields would reach somewhere between 0.17 V/m and 0.76 V/m. One recent study indicates that people can tolerate a 4 mA current (Chhatbar et al., 2017), but this intensity is problematic given that participants are likely to easily discriminate real from sham stimulation (unlike at lower stimulation levels).

TMS and kTMP entail much lower scalp E-fields than tES to achieve the same cortical E-field amplitude. As such, standard, TMS might appear to offer an alternative method to induce a continuous wave E-field of greater amplitude than possible with standard tACS (up to 250 Hz), without the safety concerns about scalp burns and pain. However, this is not practically possible. Achieving continuous E-fields down to the tES frequency range (as low as tens to hundreds of Hz) would require extreme current in the TMS coil, introducing severe power and coil heating problems. Nonetheless, in principle a train of subthreshold TMS pulses could be used to induce cortical E-field amplitudes that exceed the range of tES.

While this is possible in principle, there are notable practical limitations with this approach. First, for a chosen pulse rate in the 0-250 pulses per sec range, the frequency bandwidth generated would be very broad. Rather than the 0-250 Hz response that intuition suggests, in fact the response would include numerous harmonics of the pulse rate as well as a peak in the spectrum at a frequency of approximately 5 kHz, corresponding to the resonant frequency of the circuit supplying the current to the coil. Consequently, unlike the precisely controlled spectrum that can be achieved with the continuous wave kTMP system, pulsed TMS has extremely limited utility for probing frequency-specific effects in neural excitability. A second limitation concerns duty cycle. A train of TMS pulses would have a low duty cycle (e.g., 50 pulse per sec (pps) repetitive TMS with individual pulse duration of 280 µs has a duty cycle of only 0.014) which may impact efficacy. The continuous wave kTMP duty cycle can be as high as unity.

The discussion now turn to the way in which subthreshold paradigms are evaluated using suprathreshold TMS as a probe. An underappreciated limitation of tES methods is related to the gold standard protocol for assessing the efficacy of a stimulation protocol. Measurements of activity in a muscle are made with electromyelogram (EMG) recordings (typically from a muscle in a hand) following stimulation over the primary motor cortex with suprathreshold TMS. The TMS-elicited motor evoked potentials (MEPs) are measured before and after a subthreshold tES intervention, with the difference providing an assay of the efficacy of the intervention at inducing changes in the excitability of motor cortex neurons. However, the set of all possible tES E-fields spans a subspace orthogonal to that of the TMS E-fields.

For a spherical geometry in which the brain, skull and scalp are modeled as concentric shells of different conductivity, the set of all tES and TMS E-fields in the innermost compartment (i.e., the brain) are spanned by the $L=J-1$ and $L=J$ vector spherical harmonics, respectively (Koponen et al., 2015). These two sets of vector spherical harmonics are orthogonal as well as linearly independent. Hence, the E-fields induced by tES and TMS likely have different effects on the neural populations acted upon, in addition to their differences in spatial extent. In contrast, one version of the kTMP system will utilize a standard TMS coil for delivery, and the kTMP system can be run in parallel with a standard TMS drive unit so that subthreshold kTMP perturbations can be probed with suprathreshold TMS pulses, in situ, using the same TMS coil. When kTMP is operated in parallel with TMS, the spaces acted upon will be coincident.

Figure 2:
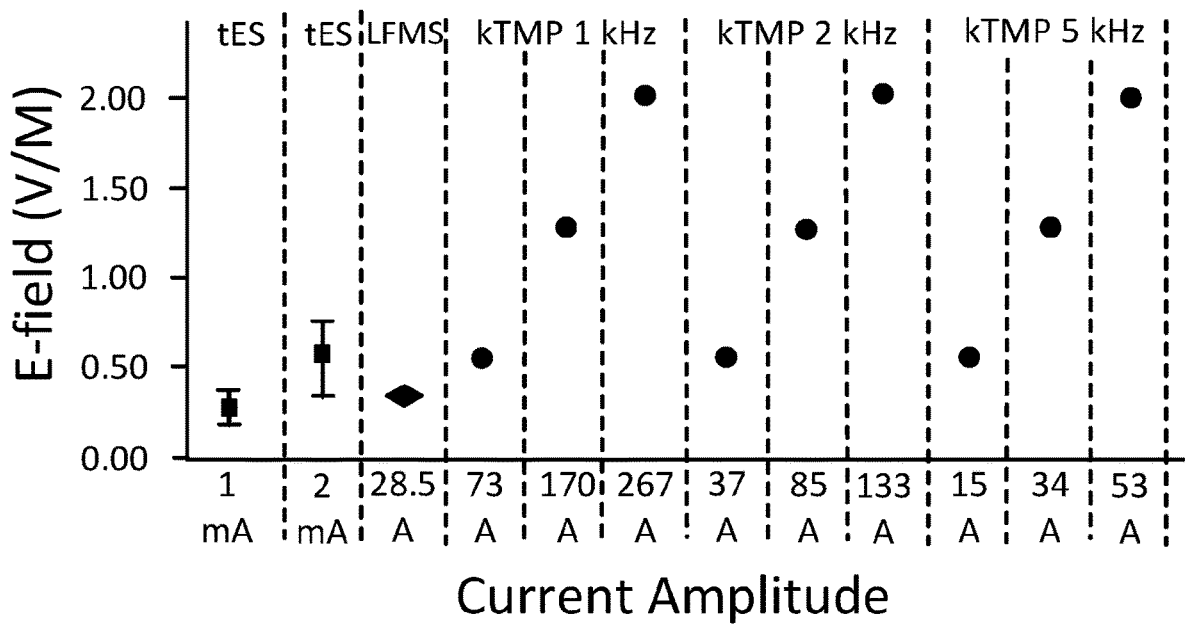
FIG. 2 shows a comparison of example electric fields generated for a given current amplitude supplied to a commercial transcranial magnetic stimulation (TMS) coil.

The discussion can now summarize the main advantages of the kTMP system. The kTMP system will deliver E-fields in a manner that combines the advantages of different NIBS methods. First, and most important, the use of continuous wave magnetic fields will allow us to induce E-fields of much greater amplitude compared to tES methods or LFMS, as shown in the examples of FIG. 2. This will not only position the embodiments to induce more robust changes in neural excitability, but the increase in dynamic range will allow for better assessment of dose-response effects. It is suspected that the range limitations with current tES systems contributes substantially to the replication problems that have plagued the NIBS literature. Second, the kTMP system benefits from the much greater focality associated with all magnetic field-based methods such as TMS relative to standard tES and whole head LFMS. Third, by producing continuous wave E-fields, the kTMP system can provide a narrow band kHz E-field response with variable frequency, enabling us to test for frequency specificity in the excitability effects. Fourth, since a conventional TMS coil can be used for subthreshold-inducing and suprathreshold-probing E-fields, the kTMP system can avoid the problem of orthogonal tES and TMS E-fields when a suprathreshold TMS probe is desired. Fifth, the diminished scalp E-fields and currents of kTMP should not produce direct activation of facial and neck muscles and thus should be more comfortable than rTMS when targeted at areas such as prefrontal cortex, temporal lobe, occipital lobe and the cerebellum.

Related to this last point, kTMP should be ideal for conducting double-blind scientific or clinical studies. In tES studies, some participants can reliably distinguish sham and real stimulation (persistent tingling); in TMS, sham stimulation may lack the tactile sensation. It is anticipated that participants will not have any tactile or thermal sensation from kTMP stimulation, even when the parameter values are set to induce E-fields in the range of 2-8 V/m. Finally, the kTMP device will be extremely quiet, with most acoustic noise produced by the current sources. Active or passive screening of the sound will mean that kTMP will not produce a perceptible auditory signal given that the sound-inducing mechanical forces within a coil are proportional to the square of the current.

Future-looking advantages of the kTMP system include the ability to administer amplitude- and/or frequency-modulated E-fields, to intersperse continuous wave and pulsed modes for different spectral responses as may be deemed useful, to vary the duty cycle to explore a new experimental space, and perform simultaneous kTMP-EEG experiments given that the narrow band kTMP artifact can be removed from the EEG signal by simple band-stop filtering. One should also note that with a modified delivery coil or set of coils and a larger current source amplifier or multiple current source amplifiers driven in parallel, it should be possible to safely increase the amplitude of the induced E-field by a considerable amount.

Figure 3:
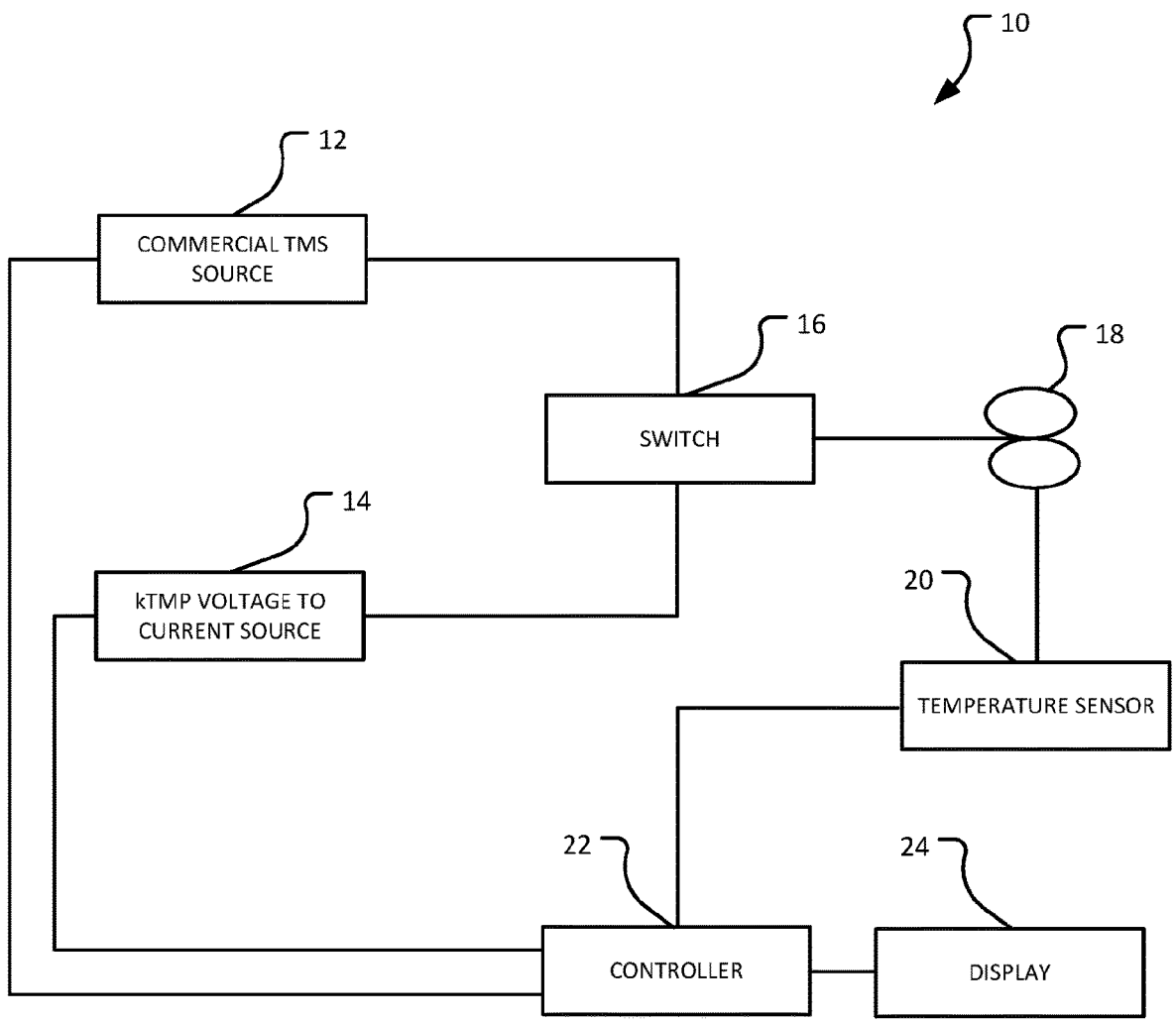
FIG. 3 shows a diagram of an embodiment of a kTMP system.

FIG. 3 shows an embodiment of a kTMP system 10. The construction of the kTMP system may entail the combination of commercial and customized components. One embodiment includes a commercial TMS coil 12 driven by a voltage-to-current amplifier 14 capable of delivering up to 200 A of current to the load, with sufficient compliance voltage, and having a carrier frequency of 0.5-10 kHz. The coil will produce a magnetic field that in turn induces the desired electric field. One embodiment of the control system will allow the researcher to choose the carrier frequency, amplitude, amplitude-modulation, and duration of the kTMP waveforms. Other embodiments of the control system may include the option for frequency modulation as well. For ease of experimentation, programmable solid-state switching 16 will allow the TMS coil 18 to be driven by either the kTMP unit or a commercially available TMS unit. The commercial TMS unit is not part of the kTMP system. However, it can be connected to the TMS coil in parallel with the kTMP system and used to elicit MEPs, allowing assessment of changes in neural excitability induced by the kTMP system. The voltage to current source 14 can be controlled to apply a continuous, rather than a pulsed field, in the coil.

In one embodiment, the control hardware will comprise a multifunction I/O Board combined with a desktop PC. This control system 22 will provide the kTMP voltage-to-current amplifier 14 with the analog voltage signal specifying the desired kTMP waveform, electronic control of the source switch 16, and a real-time graphical display of the ongoing perturbation waveform and protocol on display 24.

The terms controller or processor as used herein include microprocessors, microcomputers, Application Specific Integrated Circuits (ASICs), cloud-based servers, and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid-state memory, Random Access Memory (RAM), etc. As will be appreciated by one of skill in the art, the functionality of the program modules may be combined or distributed as desired in various aspects. In addition, the functionality may exist in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that accessible by a computing device. By way of example, and not limitation, computer-readable media may comprise computer storage media and communication media.

Computer storage media means any medium that can store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

The combination of the display and the controller, which will include user input controls, constitutes a user interface. Through the user interface, the user will be able to specify the kHz carrier frequency within set limits, specify the current amplitude within set limits, and specify the desired amplitude modulation or frequency modulation. The controller will continuously monitor coil temperature using the temperature sensor 20 and trigger system shutdown should a temperature threshold be exceeded.

On embodiment kTMP system will provide carrier frequencies in the kHz range (2-5 kHz), with the capacity to generate E-fields up to at least 2 V/m. The amplitude and frequency modulation capabilities of the kTMP system may also be of great utility in future investigations of entrainment, initially focusing on amplitude modulation only. Using either type of modulation, one can control the modulation to generate a carrier wave. Other embodiments may provide carrier frequencies of greater than 5 kHz and can generate E-fields up to at least 8 V/m.

To achieve the desired E-field range, one needs to estimate the required amplitude of the current for the kTMP system. The induced E-field amplitude, |E|, is proportional to the frequency, f, and amplitude, I, of the current source as given below.

$$|E| \propto fI \qquad \text{Eq. 1.}$$

One may recognize that the proportionality depends upon the frequency-dependent conductivity of the brain; however, the change in the conductivity over the frequency range of interest is negligible. Therefore, for any two E-fields, E1 and E2 one may write Eq. 2.

$$\frac{E_1}{E_2} = \frac{f_1 I_1}{f_2 I_2}. \qquad \text{Eq. 2}$$

One embodiment used the MagVenture Cool-B65, an E-field with amplitude $|E_2|$=185 V/m at the cortical surface (Deng et al., 2013) can be obtained with $f_2$=3570 Hz (280 μs biphasic pulse) and $I_2$=6950 A. From these reference values one obtains Eq. 3 which gives the relationship between the desired E-field amplitude and the amplitude and frequency of the current source. Vs/Am are units of (Volt seconds)/(Ampere meters).

$$|E_1| = 7.5 \times 10^{-6} \left(\frac{Vs}{Am}\right) f_1 I_1. \quad \text{Eq. 3}$$

Future embodiments may use kTMP as a new tool to influence behavior, be it to study functional hypotheses by perturbing neural excitability and plasticity in neurologically healthy individuals, or for clinical purposes as a remedial technique for populations with neurological and psychiatric disorders.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A magnetic brain stimulation system, comprising:
   a magnetic coil to generate an electric field of a magnitude having a desired effect on a brain;
   a voltage to current source that generates a continuous current having an amplitude and frequency to produce the electric field while being applied to the magnetic coil, wherein the frequency of the continuous current is in the range of 0.5-10 kiloHertz (kHz); and
   a controller that controls the voltage to current source and applies the continuous time varying current to the magnetic coil to generate an electric field sufficient to provide kilohertz Transcranial Magnetic Perturbation (kTMP) of brain tissue;
   wherein the voltage to current source is configured to produce at least one of subthreshold electric fields that alters an excitability state of the target neurons without causing immediate actions potentials in targeted neurons and suprathreshold electric fields that cause immediate action potentials in targeted neurons.

2. The system of claim 1, further comprising a display connected to the controller to allow display of the continuous current.

3. The system of claim 1, further comprising a temperature sensor attached to the coil.

4. The system of claim 3, wherein the temperature sensor is connected to the controller, the controller configured to shut down the magnetic stimulation system based upon a temperature threshold for the coil being exceeded.

5. The system of claim 1, further comprising a transcranial magnetic stimulation (TMS) source connected in parallel with the voltage to current source.

6. The system of claim 1, wherein the controller is further configured to apply the continuous current to the magnetic coil to cause periods of continuously induced electric field with constant amplitude and frequency.

7. The system as claimed in claim 1, wherein the controller is further configured to apply the continuous current to the magnetic coil to cause periods of the electric field with at least one of amplitude and frequency modulation.

8. A magnetic brain stimulation method of magnetically stimulating target neurons of a brain tissue, comprising:
   placing a magnetic coil in association with a brain to generate an electric field of a magnitude having a desired effect on the target neurons of the brain tissue;
   generating, via a voltage to current source, a continuous current having an amplitude and frequency to produce the electric field while being applied to the magnetic coil, wherein the frequency of the continuous current is in the range of 0.5-10 kiloHertz (kHz); and
   applying, via a controller that controls the voltage to current source, the continuous time varying current to the magnetic coil to produce an electric field sufficient to provide kTMP perturbation of the brain tissue by the electric field;
   producing, via the applied continuous current, at least one of a subthreshold perturbation of the brain tissue altering an excitability state of the target neurons without causing immediate actions potentials in targeted neurons and a suprathreshold perturbation of the brain tissue eliciting action potentials in the target neurons.

9. The method as claimed in claim 8, wherein the frequency of the continuous current in the range of 2-5 kHz.

10. The method as claimed in claim 8, further comprising monitoring a temperature of the coil and shutting down the system based upon the temperature exceeding a threshold.

11. The method as claimed in claim 8, wherein applying the continuous current to the magnetic coil comprises applying the continuous current in periods with constant amplitude and frequency.

12. The method as claimed in claim 8, wherein applying the continuous current to the magnetic coil comprises applying the continuous current in periods of one of either frequency or amplitude modulation.

* * * * *